United States Patent
Sun et al.

(10) Patent No.: US 11,972,299 B2
(45) Date of Patent: Apr. 30, 2024

(54) FLEXIBLE SHARING IN SHARED COMPUTER ENVIRONMENTS

(71) Applicant: International Business Machines Corporation, Armonk, NY (US)

(72) Inventors: Jingdong Sun, Rochester, MN (US); Roger Mittelstadt, Byron, MN (US); Rafal Konik, Oronoco, MN (US); Jessica R. Eidem, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 17/353,864

(22) Filed: Jun. 22, 2021

(65) Prior Publication Data

US 2022/0405144 A1    Dec. 22, 2022

(51) Int. Cl.
    *G06F 9/50*    (2006.01)
    *G06F 9/46*    (2006.01)
    *G06F 9/54*    (2006.01)

(52) U.S. Cl.
    CPC .......... *G06F 9/5061* (2013.01); *G06F 9/468* (2013.01); *G06F 9/5077* (2013.01); *G06F 9/544* (2013.01); *G06F 9/5072* (2013.01); *G06F 2209/5014* (2013.01)

(58) Field of Classification Search
    None
    See application file for complete search history.

(56) References Cited

U.S. PATENT DOCUMENTS

| | | | |
|---|---|---|---|
| 8,060,614 B2 | 11/2011 | Goldstein et al. | |
| 8,433,716 B2 | 4/2013 | Wolf et al. | |
| 8,805,951 B1* | 8/2014 | Faibish | G06F 21/6218 718/1 |
| 10,078,530 B2 | 9/2018 | Bragstad et al. | |
| 10,133,784 B2 | 11/2018 | Branson et al. | |
| 10,148,718 B2 | 12/2018 | Barsness et al. | |
| 10,216,793 B2 | 2/2019 | Ji et al. | |
| 10,320,957 B2 | 6/2019 | Cook et al. | |
| 10,341,189 B2 | 7/2019 | Fawcett | |
| 10,812,606 B2* | 10/2020 | Cortes | H04L 67/55 |
| 10,938,561 B2 | 3/2021 | Sun et al. | |
| 2008/0034370 A1* | 2/2008 | Huizenga | G06F 9/5011 718/104 |
| 2009/0106189 A1* | 4/2009 | Jain | G06F 16/24568 |
| 2012/0054280 A1* | 3/2012 | Shah | G06F 9/5072 709/205 |

(Continued)

OTHER PUBLICATIONS

Jacques-Silva et al., "Building User-defined Runtime Adaptation Routines for Stream Processing Applications," Proceedings of the VLDB Endowment, vol. 5, No. 12, Aug. 27-31, 2012, 12 pages.

(Continued)

*Primary Examiner* — Abu Zar Ghaffari
(74) *Attorney, Agent, or Firm* — Peter J. Edwards (57) ABSTRACT

A sharable resource of a first user's environment is identified. The sharable resource is configured as sharable in a shared computer environment. A matching resource that is sufficiently similar to the sharable resource is located. The matching resource is used by pre-existing users of the shared computer environment. Agreement from the pre-existing users for the first user to access the matching resource is obtained. The first user is then provided access to the matching resource.

19 Claims, 6 Drawing Sheets

(56) References Cited

U.S. PATENT DOCUMENTS

| | | | | |
|---|---|---|---|---|
| 2013/0028410 | A1* | 1/2013 | Parrish | H04L 9/0662 |
| | | | | 380/28 |
| 2015/0149737 | A1* | 5/2015 | Hobson | G06F 9/52 |
| | | | | 711/152 |
| 2015/0200945 | A1* | 7/2015 | Edson | H04L 65/403 |
| | | | | 726/28 |
| 2017/0075693 | A1* | 3/2017 | Bishop | G06F 9/4881 |
| 2017/0318021 | A1* | 11/2017 | Chaudhry | G06F 9/453 |
| 2017/0323114 | A1* | 11/2017 | Egorov | H04L 63/0435 |
| 2018/0067993 | A1 | 3/2018 | Barsness et al. | |
| 2018/0198730 | A1* | 7/2018 | Cook | H04L 65/60 |
| 2019/0130001 | A1 | 5/2019 | May et al. | |
| 2019/0132387 | A1 | 5/2019 | Singh et al. | |
| 2019/0166190 | A1* | 5/2019 | Stelmar Netto | H04L 67/1001 |
| 2019/0191308 | A1 | 6/2019 | Prasad et al. | |
| 2020/0106712 | A1* | 4/2020 | Sundaram | H04L 47/72 |
| 2022/0247799 | A1* | 8/2022 | Anderson | H04L 65/1104 |

OTHER PUBLICATIONS

Zhang et al., "εKTELO: A Framework for Defining Differentially-Private Computations," ACM, SIGMOD'18, Jun. 10-15, 2018, 16 pages, https://doi.org/10.1145/3183713.3196921.

Schneider et al., "Tutorial: Stream Processing Optimizations," ACM, DEBS'13, Jun. 29-Jul. 3, 2013, 10 pages.

Wu et al., "Parallelizing stateful operators in a distributed stream processing system: How, should you and how much?," ResearchGate, Jul. 2012, 25 pages, DOI: 10.1145/2335484.2335515.

Schneider et al., "Auto-Parallelizing Stateful Distributed Streaming Applications," ACM, PACT'12, Sep. 19-23, 2012, 11 pages.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

FLEXIBLE SHARING IN SHARED COMPUTER ENVIRONMENTS

BACKGROUND

The present invention relates to shareable computer environments, and more specifically, to configuring sharing of computer resources between users.

Sharable computing environments enable multiple users to access a set of computing resources remotely, and sometimes simultaneously. Shared computing environments can be beneficial to users who require computing resources that are too expensive for those users to purchase and maintain, but may be feasible to rent and use remotely. Some users may be willing to share these rented computing resources with other users for a reduced price. Some users, however, may utilize the rented computing resources to process sensitive data or perform proprietary analyses, and may be unwilling to share with other users.

SUMMARY

Some embodiments of the present disclosure can be illustrated as a method comprising identifying a shareable resource of a first user's user environment that is configured as sharable in a shared computer environment. The method further comprises locating a matching resource that is sufficiently similar to the sharable resource. The matching resource is used by pre-existing users of the shared computer environment. The method further comprises obtaining agreement from the pre-existing users for the first user to access the matching resource. The method further comprises providing the first user access to the matching resource.

Some embodiments of the present disclosure can also be illustrated as a system. The system comprises a processor and a memory that is in communication with the processor. The memory contains program instructions. When the program instructions are executed by the processor, they are configured to cause the processor to perform the above-described method.

Some embodiments of the present disclosure can also be illustrated as a computer program product. The computer program product comprises a computer-readable storage medium. The computer readable has program instructions embedded therewith. The program instructions are executable by a computer to cause the computer to perform the above-described method.

DETAILED DESCRIPTION

As sharable computing environments become more powerful, they become easier and less expensive to share among multiple paying consumers. These sharable computing environments may include, for example, cloud computing environments, streaming application environments, and quantum computing resources.

In cloud computing environments, users of the environment can pay for access to physical or virtual hardware for data storage and processing. In streaming application environments, users can pay to set up and operate a series of streaming operator nodes in a streaming environment that is typically hosted on remote computer hardware. These users may then use the series of streaming operator nodes to perform specific, complex workloads. With regard to quantum computing resources, users can pay to access quantum computing hardware for performing analyses that are too complex to perform with conventional computing hardware.

Because sharable computing environments continue to become more powerful, they become more realistic for the workloads of many users who previously required direct access to their owned physical hardware. As more of these users contract for access to these sharable computing environments, owners and operators of the sharable computing environments sometimes struggle to provide enough resources to all users in a way that is economical for both the owner and the users who are renting the computing resources.

One method of addressing this issue is sharing computing resources that were previously hosted as private among multiple users. For example, in a streaming-application environment, three users may pay the owner of the system that runs the streaming environment for their own streaming applications. These streaming environments may take the form of, for example, a series of streaming operators that each receive data in the form of tuples, perform a specific operation with those tuples, and output the result to another streaming operator.

In some instances, these three users may pay for private use of their entire streaming application, including all operators therein. However, in some instances, some operators of each of the three private streaming applications may perform the same operations on the same type of data. In these instances, the streaming operators could theoretically be shared between the three users. This would enable the owner of the streaming application environment to maintain only a single operator, rather than three. This could result in cost savings that can enable compensating the three users for sharing the operators. In some instances, this may make sharing the operators worthwhile both for the streaming environment owner and for the users.

However, while sharing computing resources may result in economic benefits for users of shared computing environments, some users may have concerns regarding sharing computing resources. Specifically, many users may host or process sensitive data or perform proprietary algorithms using their shared resources. In these instances, these users may wish for certain resources to remain private (e.g., only used by them) at least during sensitive operations. Some users, for example, may require that certain data storage resources, processors, or streaming operators only be accessible by those users. Some users, on the other hand, may only be willing to share their computing resources with other trusted entities. Some other users may process sensitive data only occasionally, and thus may benefit from private resources at some points, but from sharing resources at other points.

As such, the conditions under which users of shared computing environments may be willing to share particular resources of those environments can vary. However, being able to meet the various sharing preferences of those users may maximize the extent to which those users agree to share computing resources, which may, in turn, minimize the cost of operating the shared computing environment.

Thus, there is a need for added flexibility regarding what resources are shared and what are private in shared computing environments. To begin, providing users with the ability to share certain computing resources but maintain other computing resources as private may enable those users to keep sensitive data or algorithms private while benefitting from sharing computing resources that perform less-sensitive operations. Further, some users may benefit from being able to switch some resources between a private configuration and a shared configuration dependent upon the current or future activities of those resources. Even in a shared configuration, some users may not be willing to make a computer resource completely public (i.e., usable by any other users who also pay to access that resource). Some of these users may benefit from being able to configure a computer resource in a semi-public status. This may entail sharing the resource only with identified users or members of a particular group (e.g., a professional organization) or in a way that meets certain security requirements (e.g., encrypted tuple transmission between shared streaming operators).

Some embodiments of the present disclosure address the above concerns by configuring the sharing status of computer environments on a resource-by-resource basis. For example, users of shared computing environments may be able to configure their sharing preferences and requirements for each particular resource that is part of the shared computing environment for which the user pays to access. For example, user who pays for access to a set of processor cores in a cloud-computing system may specify the workloads for each core and the sharing preferences of each individual core.

As a more thorough example, a user paying for a streaming application may have configured a set of 40 streaming operators that process data workloads in the form of tuples. Because of the branching nature of streaming applications, some types of data may be directed to certain subgroups of those 40 streaming operators, whereas other types of data may be directed to other subgroups of those 40 streaming operators. Thus, if the streaming application sometimes processes sensitive data, it is possible that only 20 of those streaming operators ever accepts that sensitive data. Thus, it may benefit the user to be able to configure those 20 streaming operators as "private" (i.e., accessible only by the user for the user's workload) when the streaming application is processing sensitive data, but able to configure those 20 streaming operators as "public" (e.g., willing to share with anyone) otherwise.

Further, 10 other operators of the 40 operators may never process sensitive data and may not perform any otherwise sensitive operations, and thus the user may configure those operators as "public." Finally, while the final 10 operators may never process sensitive data, the final 10 operators may process data in a way that, combined, takes the form of a proprietary algorithm jointly developed by that user and several other identified users. For those 10 operators, the user may benefit from being able to configure them as "semi-public," sharing them only with those other identified users and only if the tuples sent between the operators are encrypted.

As illustrated above, the number of potential sharing configurations for shared computer environments operated may be very large as the complexity and number of users of those shared computer environments grows. For this reason, while there is a discussed need for added flexibility for users to configure the sharing preferences of rented computing resources, tracking those various configurations and efficiently sharing according to them may be difficult.

Some embodiments of the present disclosure may address this issue by attempting to share as many resources as possible when a user rents a new computer environment. For each resource created, the user may be required to select whether the user allows sharing of the resource, and any sharing restrictions the user may apply to that sharing (e.g., only share with these users). In some embodiments, this selection may be standardized (e.g., a pre-defined set of metadata flags that can be applied to each resource) to enable the owner of the computer environment to quickly scan the configurations of many resources at once. This may be of use in finding computing resources that match the sharing requirements of the new computing environment.

Some embodiments of the present disclosure may also require a user to select sharing preferences when creating or modifying computing resources (e.g., adding more graphics hardware processors to the user's processing array or adding more streaming operators to a stream computing environment). The stream computing system can then compare the sharing requirements of the new or modified resource with existing resources to determine whether updated sharing is possible.

Some embodiments of the present disclosure may periodically review sharing preferences of the resources rented by the users of a sharable computing environment to determine if further sharing is possible. In some embodiments, this may require a user to update the sharing preferences that are configured on the resources rented by that user.

Some embodiments of the present disclosure may also enable a user to change the sharing preferences of one or more computer resources to meet the immediate needs of that user's workloads. This may enable a user to request one or more private resources for the user's computing environment when that user expects to temporarily process sensitive data. When the user is no longer processing sensitive data, the user could request that the private resources be deleted, and the operations performed by them could then be rerouted to resources shared with other users.

Figure 1:
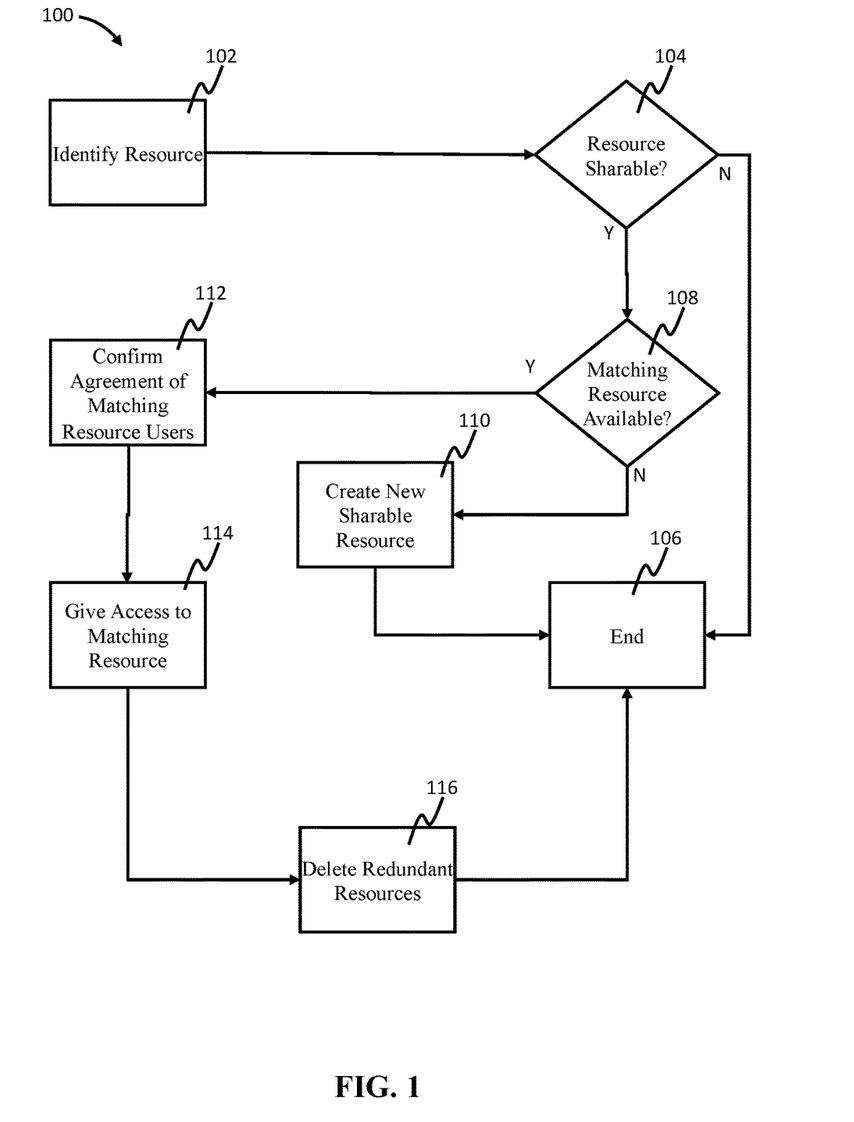
FIG. 1 illustrates a method of merging a private resource in a shared computing environment into a shared resource, in accordance with embodiments of the present disclosure.

As an illustrative example, FIG. 1 depicts a method 100 of merging a private resource in a shared computing environment into a shared resource. Method 100 could be performed by a computer system (e.g., computer system 601) that is operated by an entity that owns or operates the shared computer environment. This computer system may be configured to efficiently select resources for sharing to both minimize the amount of computer-environment resources that the entity needs to operate at any given time, while also meeting the sharing preferences of the users.

Method 100 begins in block 102, in which a new or private resource of the shared computer environment is identified. The nature of this identification may depend on the circumstances in which method 100 is being performed. For example, method 100 may be performed upon creation of a new user environment, such as a new cloud environment set up for a new user. In that case, block 102 may be performed when the user is configuring the settings of the new environment. Method 100 may also be performed upon creation of a new resource in a previously existing user environment, such when a user adds a new streaming operator in a previously existing streaming application. In that case, block 102 may be performed when the user is configuring that new streaming operator.

Method 100 may also be performed when a user is reconfiguring a previously existing private resource or computer environment, at which point the user may be requested to renew or review the sharing configurations for that private resource or the resources of that environment. In another example, the user may be requesting that a resource that was previously "private" be switched to sharable. Similarly, a computer system performing method 100 may periodically review the sharing preferences of the users of a shared computing environment and ask those users to confirm whether those preferences are still valid. In that case, block 102 may involve selecting a resource that exists in a user's shared computer environment for confirmation.

Upon identifying a resource in block 102, method 100 proceeds to block 104 in which the computer system determines whether the new or private resource can now be configured as sharable. A resource may be considered "sharable" if a user is willing to share that resource (e.g., a processor core, a GPU, a streaming operator) with other uses. For example, a user may be willing to share a resource with any other users of the shared computer environment (e.g., other users who are also renting access to the resources of a cloud computer system or who are paying to run a streaming application that is hosted by another entity). This type of sharing is sometimes referred to herein as "public" or "full public" sharing.

A user may also be willing to share a resource but may have some restrictions regarding with whom the resource is to be shared. This type of sharing is sometimes referred to herein as "semi-public" sharing. For example, a user may be willing to share a resource only with other specified users, only with users of a particular working group or organization, only with employees of a particular company, or only with users who agree to certain security requirements for the shared resource.

In some embodiments, block 104 may involve requesting a user to provide sharing information for a new resource or confirm previously submitted sharing preferences for a previously existing private resource. A user may do this, for example, by filling out a form in a management portal of the shared computer environment or entering the information in a database.

This sharing information may then be associated with the computer resource by the computer system that manages the shared computing environment. This association may take the form, for example, of adding one or more metadata tags to the resource. For example, a resource may have a "public" metadata tag attached when the user has stated that the resource could be shared with any other users. A resource may have a "private" metadata tag attached when the user has stated that the resource should not be shared with anyone. Finally, a resource may have a "semi-public" metadata tag attached when the user is willing to share the resource, but has provided sharing requirements (e.g., only share with these users). These sharing requirements may also be added to a metadata tag and attached to the resource.

In instances in which a resource is configured as semi-public, therefore, block 104 may also include identifying the sharing requirements of the resource. For example, block 104 may include determining the other users with whom the user of the identified resource is willing to share the identified resource. Block 104 may also include determining the security requirements of the shared resource (e.g., not "discoverable," encryption of data that is input to the resource and data that is output by the resource).

Block 104 may also involve identifying a user's previously entered information for a resource. For example, block 104 may involve reading a metadata flag attached to a configurations file for the resource.

If the managing computing system determines in block 104 that the resource is not sharable, it ends the process in block 106. Block 106 may involve setting up a new resource as private or maintaining the "private" status of an existing resource.

If, on the other hand, the managing computer system determines, in block 104, that the resource can be configured as "sharable," the managing computer system proceeds block 108 in which it determines if a matching resource exists with which the identified resource could be shared. The precise method of the determination in block 108 may vary based on the sharing information determined in block 104. For example, if the resource can be configured as a "public resource," then block 108 may be limited to identifying other resources that are sufficiently similar to the identified resource (e.g., resources that perform sufficiently similar operations or have sufficiently similar properties).

For example, if the resource identified in block 102 is a streaming operator, block 108 may include attempting to locate another streaming operator that performs the same functions on the same type of tuples as the identified resource, such that they could be used interchangeably in a streaming application. If the resource identified in block 102 is a storage unit for a cloud computing environment, however, block 108 may include attempting to locate another storage unit accessible by the cloud computing environment that has the similar storage properties (e.g., available capacity, access latency, write speed, etc).

In some embodiments, identifying a sufficiently similar resource may require locating a resource that is, for the purposes of the shared computing environment, identical to the identified resource. In other words, block 108 may require locating a resource that functions identically in the shared computing environment to the identified resource (for example, a streaming operator with the same exact input tuple type, operation, and output tuple type; a graphics processor of the same exact manufacture and model; or a virtual processor with the same exact number of cores or the same exact clock speed). In other embodiments, identifying a sufficiently similar resource may require locating a resource that is able to meet the requirements of the identified resource, but also may be used by other users in other ways (for example, a streaming operator that performs a first operation for a first user and a second, extremely similar operation for a second user, a graphics processor of a different manufacturer but with capabilities that exceed the identified resource, or a virtual processor with more fewer cores than the identified resource, but that run at a higher clock speed).

As discussed, if a managing computer system determines, block 104, that the identified resource can be configured as semi-public, the identified resource may have additional sharing requirements that must be met before the identified resource can be shared. In these instances, block 108 may also include locating resources that are not only sufficiently similar to the identified resource, but also that meet these sharing requirements. For example, block 108 may include only searching for resources that are rented by users on a list of users provided in block 104. Similarly, block 108 may include searching for resources that are only available to users of a particular group (e.g., employees of a company, members of a particular university, or members of joint venture group). Block 108 may also include searching for resources that meet particular security requirements, such as streaming operators that require input tuples be encrypted and that encrypt output tuples after processing.

In some embodiments, a managing computer system may search for a matching resource in block 108 by analyzing shareable property metadata tags that are associated with other resources available to the shared computer environment. For example, if the identified resource can be configured as a public resource, block 108 may include searching for a sufficiently similar resource that has a "public" metadata tag associated with its configuration file. Similarly, if the identified resource can be configured as sharable with other members of an industry working group, block 108 may include searching for other resources that have a metadata tag that lists that industry working group associated with their configuration files. In these embodiments, the ability to scan these recognizable metadata tags may enable the computer system to much more efficiently locate matching resources, increasing the efficiency with which the sharable computing environment can be managed.

In some embodiments, a managing computer system may also search, in block 108, for private resources that otherwise match the sharing requirements identified in block 104. For example, if the sharing requirements in block 104 establish that the identified resource could be a public resource, but no sharable resources whose functions are sufficiently similar to the identified resource are found, block 108 may include searching for private resources whose functions are sufficiently similar to the identified resource. A request to convert those private resources into a public resource could then be sent to the users of those private resources.

If no matching resources are discovered in block 108, the managing computer system creates a new sharable resource in block 110. In some embodiments, "creating a new sharable resource" may take the form of, for example, creating a new resource that was requested in block 102 (e.g., a new resource that is part of a new computer environment for a user, a new resource that is being added to an existing computer environment for a user) or converting a previously existing private resource into a sharable resource.

If, for example, the managing computer system determines at block 102 that a user is requesting a new resource and determines at block 104 that new resource could be configured as a public resource, block 110 may create a new public resource for that user. This public resource may later be shared with other users.

If, however, a matching resource is discovered in block 108, the managing computer system can determine, in block 112, that the users of the matching resource agree to merge the identified resource with the matching resource. Depending on the nature of any resource requirements identified in block 104 and the nature of the matching resource identified in block 108, the nature of this confirmation may vary. For example, if the managing computer system determines in block 104 that the identified resource can be configured as a "public" resource, this confirmation may simply be detecting that a metadata flag attached to a confirmation file for the matching resource is set to "public." In other words, no other permission may be required.

However, if the managing computer system determines in block 104 that the identified resource may only be shared with members of a particular organization, the matching resource in block 108 would also require that it only be shared with members of that organization. Thus, in this instance block 112 may include asking the current users of the matching resource to confirm that the user of the identified resource is a member of that organization or that they approve sharing the identified resource with the user. This is discussed further in relation to FIG. 2.

Once the agreement is confirmed, the managing computer gives, in block 114, the user of the identified resource access to the matching resource. The nature of this access may depend upon the nature of the shared and the properties of the matching resource. For example, in a streaming application, providing a user access to a shared streaming operator may include directing the upstreaming operators of the user's streaming application to output tuples to the shared streaming operator, and directing the downstream operators of the user's streaming application to accept tuples from the shared streaming operator. If, on the other hand, the shared resource is a storage resource in a cloud computing environment, an address table of the cloud processor nodes used by the user's computing environment may be updated to contain entries to the storage resource.

Upon giving a user of the identified resource access to the shared matching resource, the managing computer system deletes any redundant resources that are no longer needed. For example, if the identified resource discovered at block 102 were a pre-existing private resource that a user requested be reconfigured into a public resource, block 116 may include deleting the identified resource. On the other hand, if the identified resource discovered at block 102 did not yet exist but was requested as part of a new (or existing) environment for the user, block 116 may simply involve deleting a record of the resource or listing it as an "inactive" resource. If the identified resource were a physical resource (e.g., a set of physical processor cores), deleting the redundant resources may include marking that physical resource as unassigned and available for dedication to a user environment.

As discussed, configuring a resource as semi-public may involve more sharing restrictions than configuring a resource as fully public. For example, a more thorough determination regarding whether the current users of a matching semi-public resource approve providing access to the new user may be necessary.

Figure 2:
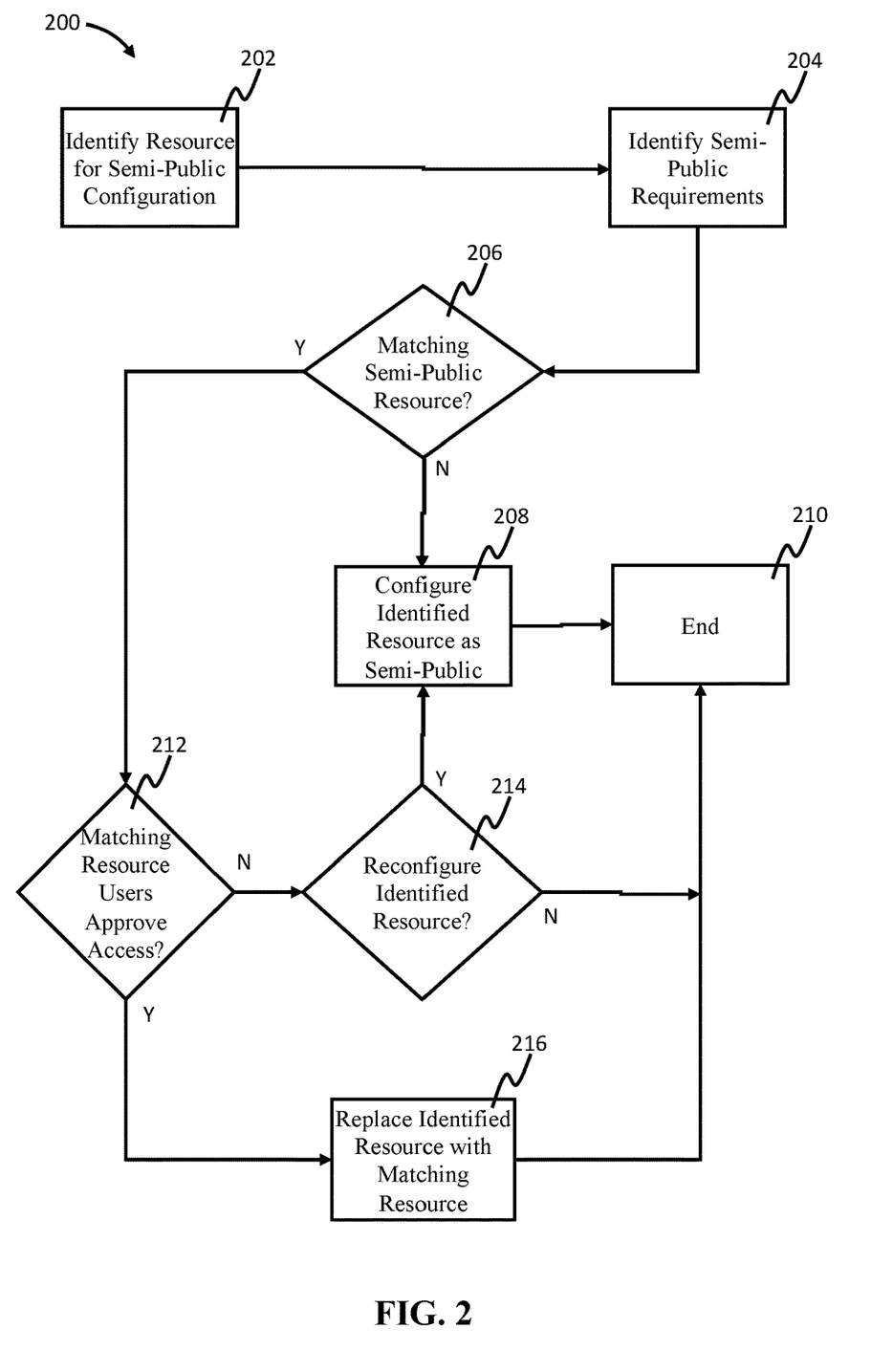
FIG. 2 illustrates a method of configuring a computer resource as a semi-public sharable resource, in accordance with embodiments of the present disclosure.

As such, configuring a resource as semi-public is discussed more thoroughly in FIG. 2. FIG. 2 illustrates method 200. Like method 100, method 200 may be performed upon the creation of a new user environment, upon the creation of a new resource in an existing user environment, upon a user's request to reconfigure an existing resource (e.g., a request to switch a private resource to semi-public or to switch from a public resource to a semi-public resource), or as part of a periodic review of the sharing preferences of a shared user environment (for example, a review to maximize the sharing of resources permitted by user preferences. Also like method 100, method 200 may be performed by a managing computer system that (e.g., computer system 601) that is operated by an entity that owns or operates the shared computer environment.

Method 200 begins in block 202, at which a resource for semi-public configuration is identified. As noted, this resource may be a completely new resource that is being configured in a completely new user environment or a new resource that is being configured in an existing user environment. Further, block 202 may identify the resource in response to a user requesting that the resource be switched to a semi-public resource. For example, a user of a streaming application may have a private operator in the streaming application due to processing of confidential data. However, if that user were to stop processing confidential data in that private operator, the user may become willing to share that operator (or a matching operator) with other users. On the other hand, if the user makes use of a public operator in the streaming application but plans to process confidential data in the future, the user may desire to replace that public operator with a semi-public operator that is only access by trusted parties or that has higher security settings.

Once the resource is identified in block 202, the managing computer system identifies the requested semi-public sharing requirements in block 204. This may involve analyzing a configuration file for the resource, analyzing a metadata tag associated with the resource, or analyzing a user request to configure the resource as semi-public. For example, the semi-public requirements may be a list of entities (e.g., individuals, companies, governmental departments) with whom the user would be willing to share the resource. The semi-public requirements may also include a list of security standards that would be required for all use of the inputs. For example, if the resource is a cloud storage device, the user may require that all data be encrypted at rest on the storage device. If the resource is a processor (or component thereof) in a cloud computing environment, the user may require that certain insecure methods of speculative execution.

In some embodiments, the semi-public requirements may include the conditions under which the semi-public resource could be terminated (e.g., replaced with private resources). For example, a semi-public resource may include an agreement that it cannot be disbanded unless a threshold percentage of users (e.g., 50%, 100%) of the semi-public resource agree. This may be beneficial for users of semi-public resources who are able (or willing) to pay reduced fees for a shared resource, are unable (or unwilling) to pay the complete fee for a private resource if that shared resource is disbanded and all users are provided with a private resource.

Once the semi-public requirements are identified in block 204, the managing computer system determines, in block 206, whether there are any resources available to the user's user environment that match the semi-public requirements. The determination at block 206 may include identifying resources with sufficiently similar functions to the resource identified in block 202. This may include requiring the exact same storage capacity, the exact same operation performed on input tuples, processing power that is within a threshold of the identified resource's processing power, same part number, or others.

The determination in block 206 may also vary based on the nature of the semi-public requirements identified in block 204, and may be similar to the determination with respect to semi-public resources in 108. For example, if the semi-public requirements identified in block 204 require that the user only wishes to share resources with an academic working group, the determination at block 206 may only select resources that restrict anyone who is not a member of that academic working group from accessing that resource. If the semi-public requirements identified in block 204 require that certain security restrictions be met, block 206 may only select resources that prohibit uses that do not meet those security restrictions. If the semi-public requirements identified in block 204 require that the semi-public resource can only be disbanded if all users agree to disband it, block 206 may only select resources with that termination requirement.

If the managing computer system does not locate, in block 206, a resource that matches the semi-public requirements of the identified resource, the managing computer system proceeds to configure, in block 208, the identified resource as a semi-public resource with the requirements and properties identified in block 204. The specifics of this configuration may vary based on the nature of the resource identified in block 202. For example, if the identified resource is an existing private resource in a user's user environment, block 208 may comprise removing a "private" metadata flag from the resource, adding a "semi-public" metadata flag to the resource, and adding the semi-public requirements in a second metadata flag that is attached to the resource.

On the other hand, if the identified resource is not yet an existing resource, block 208 may create a new resource that is configured for semi-public sharing based on the requirements identified in block 204. For example, the identified resource may be a streaming operator that a user is attempting to add to a streaming application. In this case, block 208 may include creating the identified resource as a streaming operator and notifying related upstreaming operators, jobs, and applications to input data to the new streaming operator and configuring related downstream operators, jobs, and applications to accept output data from the new streaming operator. The managing computer system could then add a metadata flag to the new streaming operator that establishes the streaming operator as semi-public and lists the semi-public restrictions identified at block 204. Once the identified resource is configured as a semi-public resource in block 208, method 200 ends in block 210.

However, if a matching semi-public resource is not identified in block 206, the managing computer system determines, in block 212, whether the users of that matching semi-public resource approve providing access to the user of the identified resource. The nature of this determination may vary based on the properties and requirements of the matching resource. For example, some semi-public resources may require that all pre-existing users of the semi-public resource approve adding a new user to that semi-public resource (i.e., providing access to that semi-public resource to the user). In these instances, block 212 may include contacting those pre-existing users and requesting approval for adding the new user to the matching resource.

On the other hand, some semi-public resources may simply require that new users are on a list of pre-approved users. In these instances, block 212 may include cross referencing the information available for the user (e.g., a name, username, or ID number) of the identified resource and determining whether it matches that list. Other resources may require that new users are affiliated with an organization, such as employees of a company or members of a research collaboration.

If approval is not granted in block 212, the managing computer system is unable to grant access to the matching resource (i.e., cannot add the user of the identified resource to the matching resource). This may occur, for example, if the matching resource has added requirements not met by the user of the identified resource or the planned use of the matching resource. For example, the user of the identified resource may be a member of the research collaborative that is required by the matching resource, but the user's user environment may not meet the security requirements for access to the matching resource.

If approval is not granted in block 212, the managing computer system determines, in block 214, if the identified resource should be configured as a new semi-public resource. This may include informing the user of the identified resource that the pre-existing users did not grant access to the matching resource, and asking the user if the user wishes to operate the identified resource in a private configuration or establish a new semi-public resource that the user can share with other users. In some instances, the user may wish to contact the pre-existing members to appeal their decision or adjust the user's user environment to meet the requirements of the matching resource. In those instances, the user may not wish to configure the identified resource as semi-public.

If the managing computer system determines, in block 214, that the identified resource should not be configured as a new semi-public resource, method 200 ends in block 210. However, if the identified resource should be configured as a new semi-public resource, the managing computer system proceeds to do so in block 208, as previously discussed, after which method 200 ends in block 210.

However, if approval is granted in block 212, the managing computer system can grant the user of the identified resource access to the matching resource. This includes replacing the identified resource with the matching resource in block 216. The nature of replacing the identified resource with the matching resource may vary based on the circumstances of the identified resource. For example, if the identified resource is a pre-existing resource in the user's user environment, block 216 may include updating the user environment to stop using the identified resource and start using the matching resource and deleting the identified resource.

If, on the other hand, the identified resource is not a pre-existing resource (for example, if the identified resource is being configured as part of a new user environment), block 216 may include adding the matching resource to the new user environment.

Once the managing computer system replaces the identified resource with the matching resource in block 216, method 200 ends in block 210.

As discussed previously, some users of shared computing environments may have inconsistent usage requirements. As a result, some users may, for example, process or store sensitive data or perform trade-secret algorithms during some periods, but not others. These users may benefit from the flexibility to switch resources from a shared configuration and a private configuration to meet the user's present usage requirements. This may provide economic benefit to the user while meeting the user's security requirements. Further, this flexibility may increase the amount of resource sharing in the user environments, reducing the amount of resources the environment owners and operators are required to maintain.

Figure 3:
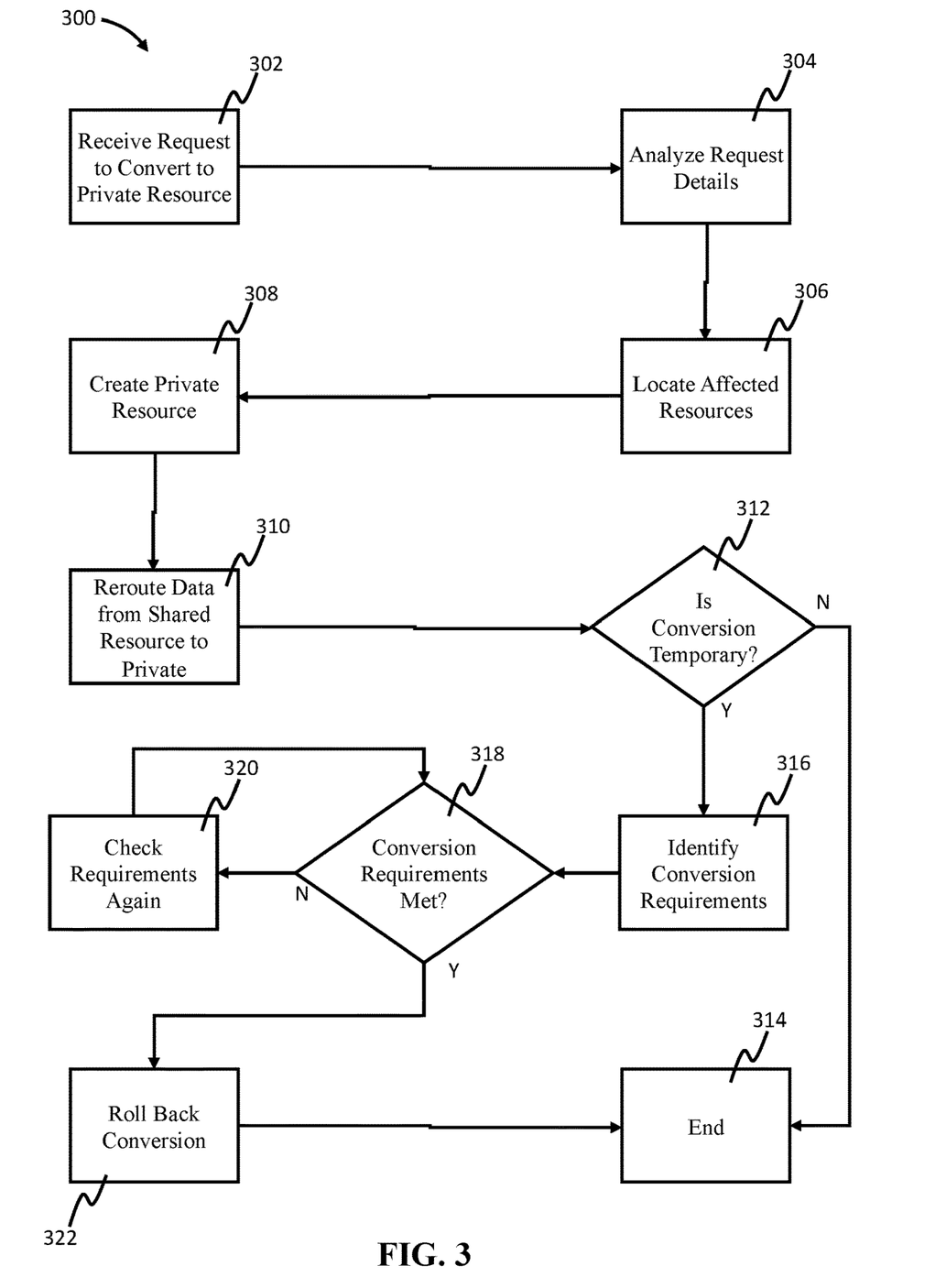
FIG. 3 illustrates a method of flexibly converting between private and shared resources in a shared computing environment, in accordance with embodiments of the present disclosure.

FIG. 3 illustrates a method 300 of flexibly converting between private and shared resources in a shared computing environment. Method 300 may begin in response to a user of a shared computer environment to convert a shared resource to a private resource in that user's user environment. Like methods 100 and 200, method 300 may be performed by a managing computer system that (e.g., computer system 601) that is operated by an entity that owns or operates the shared computer environment.

Method 300 begins in block 302 in which a managing computer system receives a request by a user to convert a shared resource into a private resource. This may take the form, for example, of a user of a streaming application requesting that one of the operators in the streaming application no longer be shared with other users of other streaming applications.

In response to receiving the request in block 302, the managing computer system analyzes the request details in block 302. The request details may provide information such as the user's environment information, the resources affected, and the duration of the request. For example, the managing computer system may identify, at block 100, the particular streaming environment of the user, the operator that is switching from shared to private, the upstream and downstream operators of that switching operator, and that the switching operator should switch back from a private configuration to a public configuration at the end of an identified workload (e.g., a set of data to process).

In block 306, the managing computer system locates the affected resources in the user's environment based on the request details analyzed in block 304. For example, block 306 may include identifying the address of a shared storage in a cloud computing environment, identifying the network ID of a server in a cloud computing environment, or identifying a streaming operator that is switching to a private resource, as well as the upstream and downstream operators in the user's streaming application.

After located the affected resources in block 306, the managing computer system creates, in block 308, a new private resource for the user's user environment. For example, if a user were requesting switching a streaming operator from a public configuration to a private configuration, block 308 may include analyzing the properties and functions of that public streaming operator based on the details analyzed at block 304. The managing computer system may then duplicate those properties and functions in a private streaming operator in block 308 and add the private streaming operator to the user's streaming application.

Once the user's private resources is created in block 308, the managing computer system reroutes, if necessary, data from the shared resource to the new private resource in block 310. As discussed previously, this may vary based on the nature of the resource and the user environment. If the user is switching a shared storage unit in a cloud computing environment to a private storage unit, block 310 may include cloning the user's data from the shared storage unit to the private storage unit and remapping the address of the user's storage in a cloud processing node from the shared storage unit to the private storage unit. If, on the other hand, the user were switching a shared streaming operator in a streaming application to a private streaming operator, block 310 may include updating the upstreaming operators and processes to input data to the new private operator rather than the previous shared operator.

Upon creating the private resource in block 308 and rerouting the data in block 310, the user may begin to use the new private resource in the user's user environment. At that point, the managing computer system determines, in block 312, whether the request received in 302 is for a permanent conversion or a temporary conversion. This determination may be made based on the analysis performed in block 304. A user may request a permanent conversion, for example, if the user has an indefinite need to process sensitive data in the user environment, and thus may need the private resource indefinitely. In that case, method 300 ends in block 314.

However, if the managing computer system determines, in block 312, that the user requested a temporary conversion to a private resource, the managing computer system proceeds to identify the conversion requirements for the request in block 316. A conversion requirement, as used herein, refers to a prerequisite condition or condition that, upon occurrence, signifies that the private resource established in block 308 is no longer necessary to the user. The information necessary for identifying the conversion requirements may be available from the request details analyzed at block 304.

For example, a user may have converted a shared resource to a private resource because the user was testing a new proprietary algorithm, but did not trust the security in the set of public processing nodes used by the user's user environment. However, the user may know in advance that the test needs to be completed by a certain deadline (e.g., one month). Thus, in this example, the user may set a conversion requirement of a one-month duration. In other words, one month after block 308 occurred, the conversion requirement would be met.

As another example, a user may have converted a shared streaming operator to a private streaming operator because the user was processing an amount of sensitive data. In this example, the user may set a conversion requirement of processing that data set. In other words, once the streaming application has finished processing the data set that is identified in the request details, the conversion requirement would be met.

Upon identifying the conversion requirements in block 316, the managing computer system determines, in block 318, if those conversion requirements are met. This determination may vary based on the nature of the conversion requirements. In some instances, for example, block 318 may determine whether a requisite amount of time since the private resource was created in block 308, or since the request was received in block 302. In some instances, block 318 may also take the form of analyzing the user environment to determine if a set of data identified in the request details analyzed in block 304 have been fully processed.

If the managing computer system determines, in block 316, that the conversion requirements have not been met, method 300 proceeds to block 320, at which point the conversion requirements that were identified in block 316 are checked again. In some embodiments, block 320 may include a delay before rechecking the conversion requirements in order to avoid an extremely fast, unchecked loop. The length of this delay may vary based on the use case. For example, if the conversion requirements are limited to processing a small amount of data that is expected to take one hour, the delay may be relatively short (e.g., 2 minutes). However, if the conversion requirements include processing a large data set that is expected to take several months or a year, the delay may be relatively long (e.g., one week).

Upon checking the conversion requirements again in block 320, the managing computer system returns to block 318 to determine whether the conversion requirements have been met. Once the managing computing system determines that the conversion requirements have been met, the managing computer system proceeds to roll back the conversion in block 322.

Rolling back the conversion in block 322 essentially reverses the conversion performed in blocks 308 and 310. In other words, the private resource that was created in block 308 may be deleted or repurposed and data may be rerouted back from the private resource to the previous shared resource. The operations of block 322 may resemble, for example, the operations of method 100 or method 200. Once the conversion is rolled back in block 322, method 300 ends in block 314.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
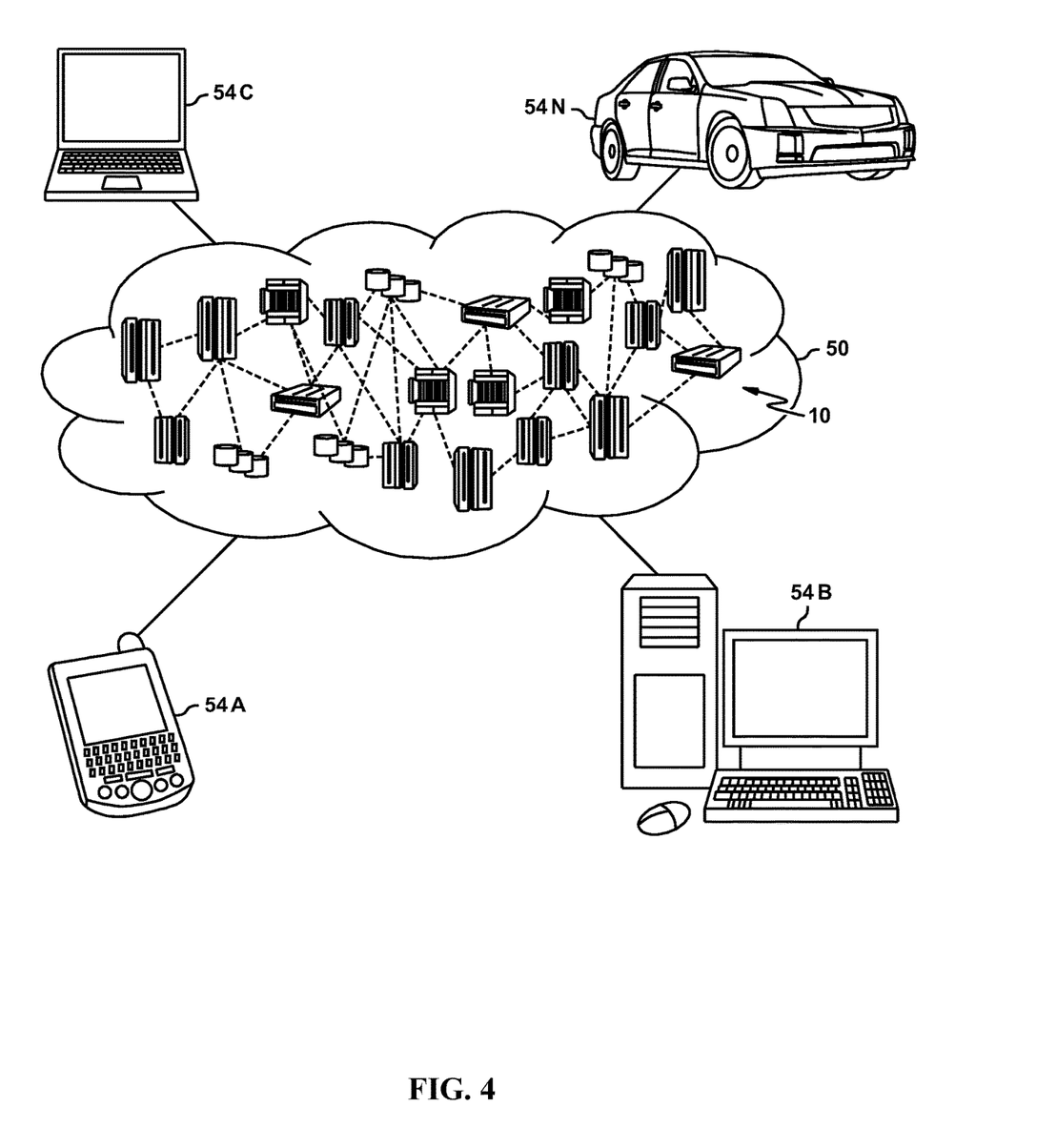
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
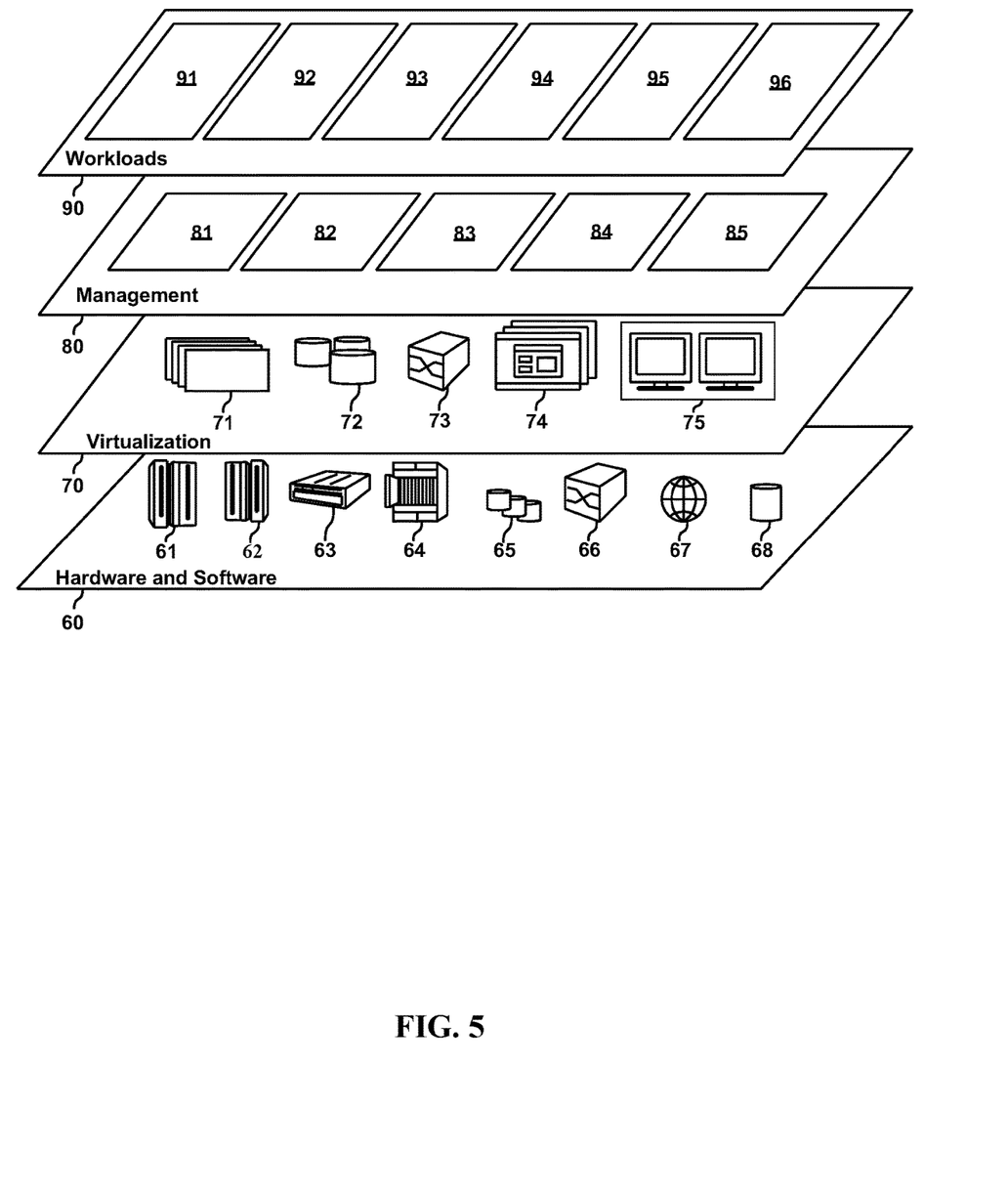
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 6:
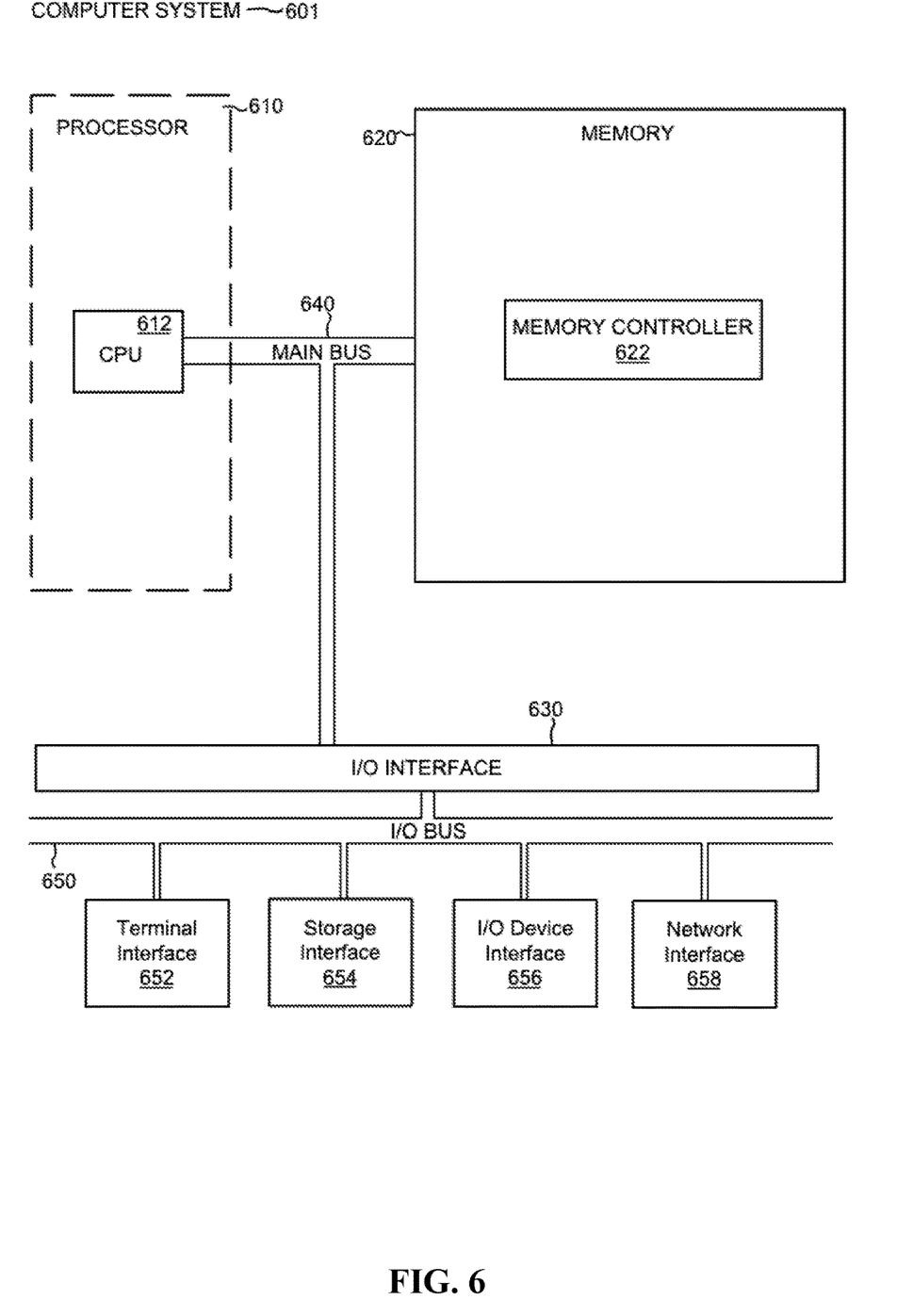
FIG. 6 depicts the representative major components of a computer system that may be used in accordance with embodiments.

FIG. 6 depicts the representative major components of an example Computer System 601 that may be used in accordance with embodiments of the present disclosure. The particular components depicted are presented for the purpose of example only and are not necessarily the only such variations. The Computer System 601 may include a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may include one or more CPUs 612. The Processor 610 may additionally include one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may include one or more circuits configured to perform one or methods consistent with embodiments of the present disclosure. In some embodiments, the Computer System 601 may contain multiple Processors 610 typical of a relatively large system. In other embodiments, however, the Computer System 601 may contain a single processor with a singular CPU 612.

The Memory 620 of the Computer System 601 may include a Memory Controller 622 and one or more memory modules for temporarily or permanently storing data (not depicted). In some embodiments, the Memory 620 may include a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may include an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may include the Terminal Interface 652, the Storage Interface 654, the I/O Device Interface 656, and the Network Interface 658. In some embodiments, the various interfaces may include a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying a sharable resource that is part of a first user's user environment and that is configured as sharable by the user, wherein user environment is a streaming application and the sharable resource is a private streaming operator;
    locating a matching resource that matches the sharable resource, wherein the matching resource is a shared streaming operator that is used by pre-existing users of a shared computer environment;
    obtaining agreement from the pre-existing users for the first user to access the matching resource, wherein the obtaining comprises confirming that the shared streaming operator is configured as public;
    providing the first user access to the matching resource; wherein the providing comprises:
        deleting the private streaming operator;
        configuring an upstream operator in the user's streaming application to input data to the shared streaming operator; and
        configuring a downstream operator in the user's streaming application to accept output data from the shared streaming operator; and
    transferring data, after the providing, from the upstream operator to the shared streaming operator.

2. The method of claim 1, wherein the locating comprises detecting that the function of the matching resource is identical to the function of the sharable resource.

3. The method of claim 1, wherein the sharable resource is configured as publicly sharable, and the matching resource is a public resource.

4. The method of claim 1, wherein the sharable resource is configured as semi-publicly sharable, and wherein the method further comprises:
    identifying a set of semi-public requirements for the sharable resource; and
    detecting that the matching resource meets the semi-public requirements.

5. The method of claim 4, wherein the semi-public requirements comprise an encryption standard for data processed by the matching resource.

6. The method of claim 1, further comprising:
    receiving, after the providing, a request from the first user for a conversion of the matching resource to a private resource; and
    converting, for the first user, the matching resource to a private resource, the conversion comprising:
        creating, in response to the receiving, a private resource that matches the matching resource; and
        incorporating the private resource into the first user's user environment.

7. The method of claim 6, further comprising:
    identifying a conversion requirement in the request;
    detecting that the conversion requirement has been met;
    rolling back, based on the detecting, the conversion of the matching resource.

8. The method of claim 6, wherein the conversion does not affect the pre-existing users or the matching resource.

9. The method of claim 1, wherein a second user's user environment contains a private resource with a function that matches the sharable resource, and wherein the providing does not affect the private resource.

10. A system comprising:
    a processor; and
    a memory in communication with the processor, the memory containing program instructions that, when executed by the processor, are configured to cause the processor to perform a method, the method comprising:
        identifying a sharable resource that is part of a first user's user environment and that is configured as sharable by the user, wherein user environment is a steaming application and the sharable resource is a private streaming operator;
        locating a matching resource that matches the sharable resource, wherein the matching resource is a shared streaming operator that is used by pre-existing users of a shared computer environment;
        obtaining agreement from the pre-existing users for the first user to access the matching resource; and
        providing the first user access to the matching resource;
        receiving, after the providing, a request from the first user for a conversion of the matching resource to a private resource; and
        converting, for the first user, the matching resource to a private resource.

11. The system of claim 10, wherein the locating comprises detecting that the function of the matching resource is identical to the function of the sharable resource.

12. The system of claim 10, wherein the sharable resource is configured as publicly sharable, and the matching resource is a public resource.

13. The system of claim 10, wherein the sharable resource is configured as semi-publicly sharable, and wherein the method performed by the processor further comprises:

identifying a set of semi-public requirements for the sharable resource; and detecting that the matching resource meets the semi-public requirements.

14. The system of claim 10, wherein the obtaining comprises confirming that the shared streaming operator is configured as public.

15. The system of claim 10, wherein the providing comprises:

deleting the private streaming operator;

configuring an upstream operator in the user's streaming application to input data to the shared streaming operator; and configuring a downstream operator in the user's streaming application to accept output data from the shared streaming operator.

16. A computer program product, the computer program product comprising a computer readable storage medium having program instructions embodied therewith, the program instructions executable by a computer to cause the computer to:

identify a sharable resource that is part of a first user's user environment and that is configured as sharable by the user, wherein user environment is a streaming application and the sharable resource is a private streaming operator;

locate a matching resource that matches the sharable resource, wherein the matching resource is a shared streaming operator that is used by pre-existing users of a shared computer environment;

obtain agreement from the pre-existing users for the first user to access the matching resource, wherein the obtaining comprises confirming that the private streaming operator is configured as public; and provide the first user access to the matching resource wherein the providing comprises:

deleting the private streaming operator;

configuring an upstream operator in the user's streaming application upstream operators to input data to the shared streaming operator; and configuring a downstream operator in the user's streaming application downstream operators to accept output data from the shared streaming operator;

receive, after the providing, a request from the first user for a conversion of the matching resource to a private resource; and convert, for the first user, the matching resource to a private resource.

17. The computer program product of claim 16, wherein the locating comprises detecting that the function of the matching resource is identical to the function of the sharable resource.

18. The computer program product of claim 16, wherein the sharable resource is configured as publicly sharable, and the matching resource is a public resource.

19. The computer program product of claim 16, wherein the program instructions are further executable by the computer to cause the computer to:

receive, after the providing, a request from the first user for a conversion of the matching resource to a private resource; and convert, for the first user, the matching resource to a private resource, the conversion comprising:

create, in response to the receiving, a private resource that matches the matching resource; and incorporate the private resource into the first user's user environment.

\* \* \* \* \*